Nov. 25, 1924.
E. H. BELDEN
1,516,698
CHANGE SPEED GEAR MECHANISM
Filed May 3, 1918
2 Sheets-Sheet 1
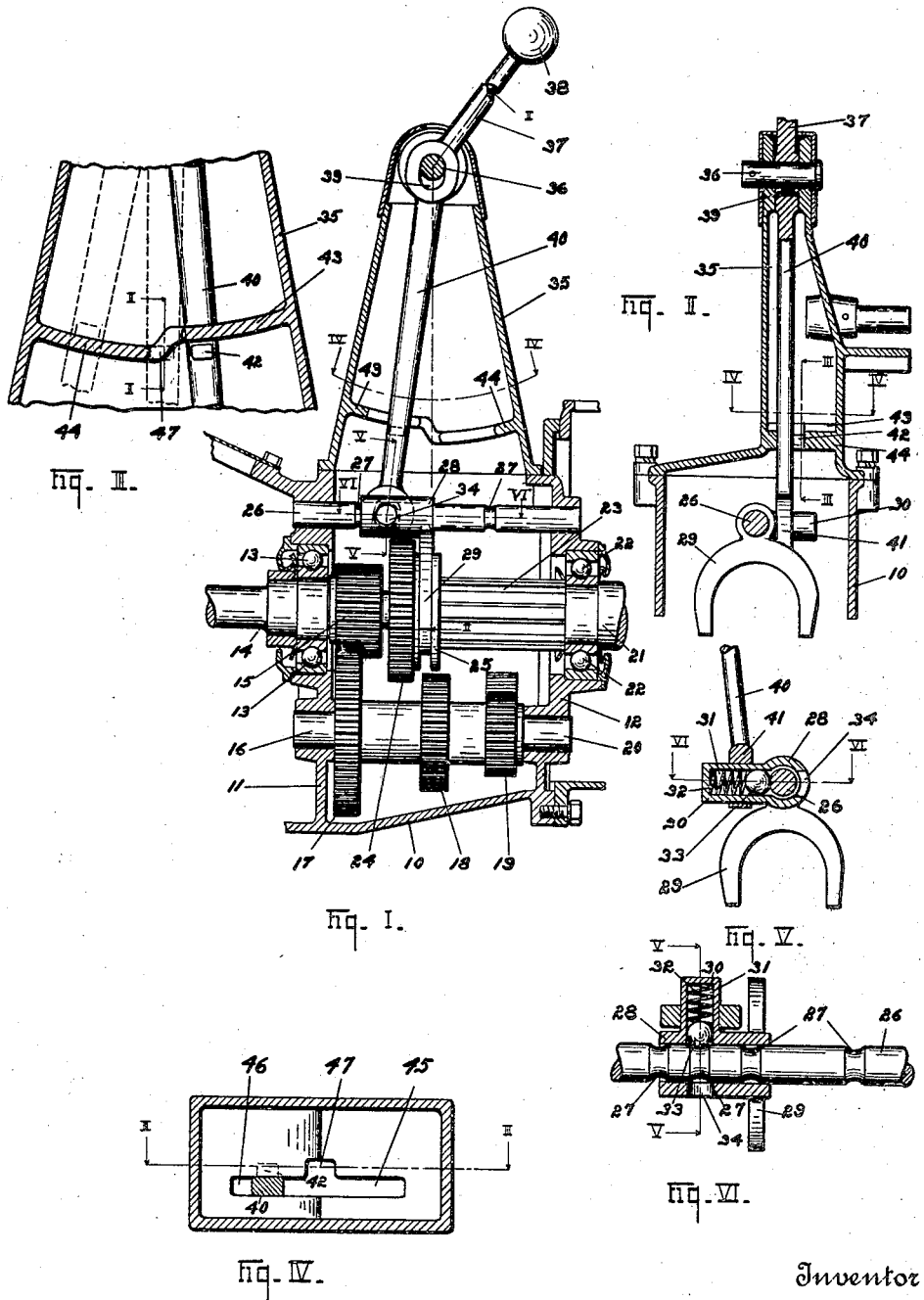
Inventor
Edward H. Belden
By Chester H. Braselton
Attorney

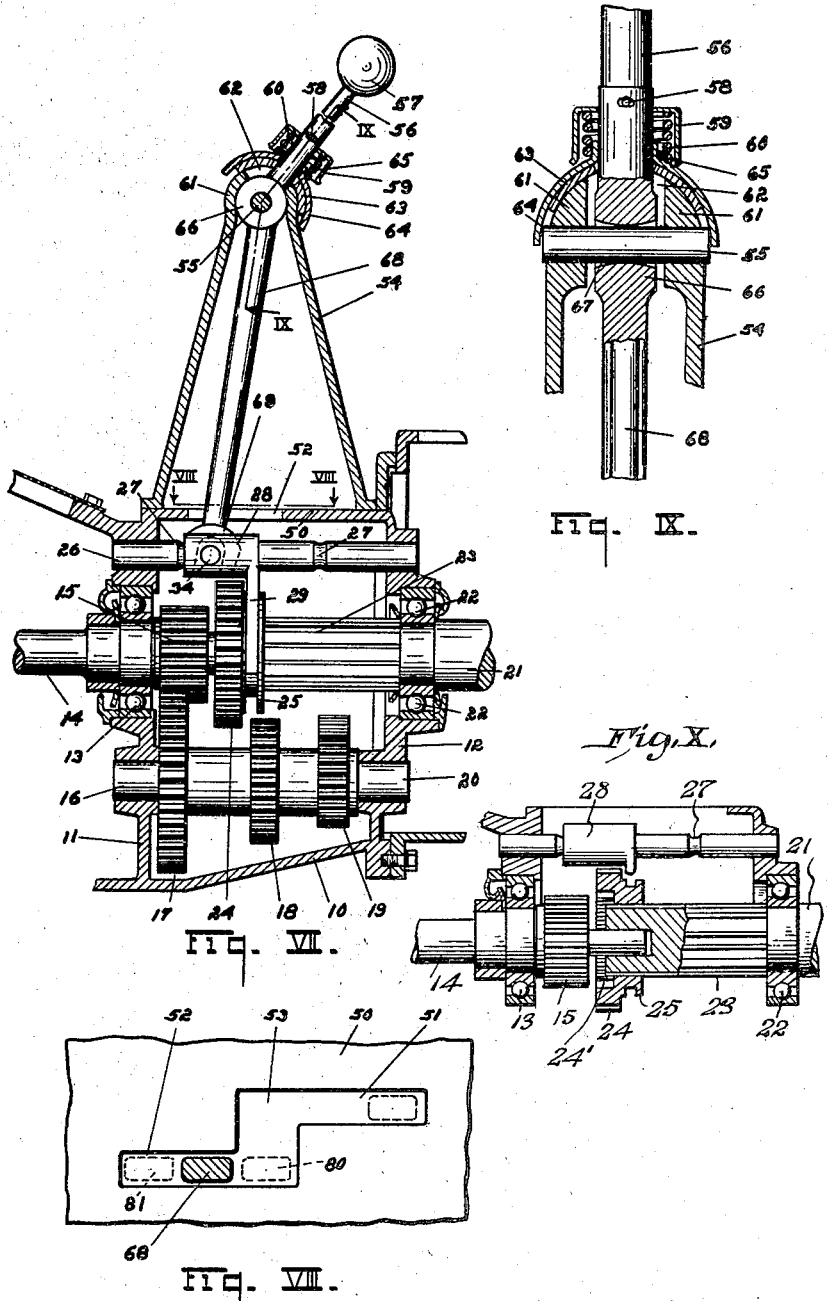

Patented Nov. 25, 1924.

1,516,698

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

CHANGE-SPEED-GEAR MECHANISM.

Application filed May 3, 1918. Serial No. 232,276.

*To all whom it may concern:*

Be it known that I, EDWARD H. BELDEN, a citizen of the United States, residing at Toledo, in the county of Lucas and State of Ohio, have invented certain new and useful Improvements in Change-Speed-Gear Mechanism, of which I declare the following to be a full, clear, and exact description.

This invention relates to improvements in change-speed gear mechanism for motor vehicles, and more particularly to change-speed gear mechanism of the selective type employing sliding gears. The sliding gear transmission illustrated in the accompanying drawings and described in this specification resembles in many particulars the change-speed gear mechanism illustrated, described and claimed in my co-pending application Serial 181,556, filed July 19, 1917, and, in so far, as the disclosure in this application is the same as the disclosure in the application above referred to, the present application is a continuation of said co-pending application.

The principal object of this invention is to provide an improved sliding gear transmission for use in motor vehicles.

A further object of this invention is to provide an improved detent mechanism for sliding gear transmission for motor vehicles.

A further object of this invention is to provide improved means for controlling the movement of the lever used for operating the sliding gears.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Fig. I is a vertical sectional view taken through a transmission embodying my invention.

Fig. II is a fragmentary, detail, sectional view, taken substantially on the line II—II of Figs. I and III.

Fig. III is a detail, sectional view, taken substantially on the line III—III of Figs. II and IV.

Fig. IV is a detail, sectional view, taken substantially on the line IV—IV of Figs. I and II.

Fig. V is a fragmentary, detail, sectional view, taken substantially on the line V—V of Figs. I and VI.

Fig. VI is a fragmentary, detail, sectional view, taken substantially on the line VI—VI of Figs. I and V.

Fig. VII is a vertical, sectional view through a transmission embodying a modified form of my invention.

Fig. VIII is a detail, sectional view, taken substantially on the line VIII—VIII of Fig. VII, and, Fig. IX is a fragmentary, detail, sectional view, taken substantially on the line IX—IX of Fig. VII.

Fig. X is a longitudinal sectional view through a portion of the change speed gearing illustrating the internal gear formed upon the shifting gear.

In the drawing, similar reference numerals refer to similar parts throughout the several views and the sectional views are taken looking in the direction of the little arrows at the ends of the section lines.

Considering the numbered parts of the drawing, I have shown a transmission case having a bottom wall 10 and end walls 11 and 12. The end wall 11 carries a bearing 13 in which the drive shaft 14 is journaled, said drive shaft 14 having the gear 15 secured thereto. A counter shaft 16 is journaled at one end in the end wall 11, the other end 20 of said counter shaft being journaled in the end wall 12. The gear 17 is fixed on the counter shaft 16 and meshes with the gear 15, and gears 18 and 19 of different diameter are also mounted on the counter shaft 16. The main transmission drive shaft 21 is journaled in the bearing 22 carried by the end wall 12 in line with the bearing 13. The main transmission drive shaft is provided with splines 23 on which the gear 24 is slidably mounted so as to slide on said main transmission drive shaft although non-rotatably connected therewith. Gear 24 is provided with a clutch part, 24', by means of which, when the gear is moved to the left in Fig. I, it will clutch with the gear 15 so that the main transmission drive shaft 21 is driven directly from the drive shaft 14.

A grooved collar 25 is attached to the gear 24 as shown in Fig. I of the drawing. A rod 26 is mounted in the upper part of the transmission case in the end walls 11 and 12, and is provided with a plurality of annular notches 27. A sleeve 28 is slidably mounted on said rod 26 and provided with a depending fork 29, the ends of which are disposed in the groove of the collar 25, so that a shifting of the sleeve 28 on the rod 26 shifts the gear 24 on the splined portion 23 of the main transmission shaft 21. A cylindrical boss 30 (Figs. V and VI) extends laterally from the sleeve 28 and is provided with a chamber 31 therein, in which is disposed a compression spring 32, and a ball 33, said spring 32, seated between the bottom of the chamber 31 and said ball, so as to normally press this ball outwardly. An opening 34 (Fig. V) is provided in the sleeve 28 in line with the chamber 31 so that the ball may be inserted in position in front of the spring 32 through said opening 34. The ball 33 is adapted to seat in any one of the notches 27 on the shaft or rod 26 so as to hold the sleeve 28 against inadvertent movement on said rod.

A housing 35 is secured to the upper part of the gear case carrying at its upper end a transversely extending pin 36. A lever 37 is provided with a handle 38 at its upper end, said lever 37 extending through a slot provided in the upper end of the housing 35. The hub of the lever 37 is provided with an elongated slot 39 through which the pin 36 extends, so that the lever 37 is fulcrumed on said pin in such a way as to permit a vertical movement of the lever 37 relative to the pin 36. From the hub of the lever there extends the arm 40 having a fork 41 at its lower end embracing the laterally extending cylindrical boss 30 on the sleeve 28.

Within the housing 35 there is provided a partition wall extending from one side of the housing to the other a short distance above the lower end thereof, and said partition wall comprises two portions, 43 and 44, respectively, which are out of alignment with each other, said portions being formed on radii of circles having their centers at the center of the pin 36, the portion 43 being located nearer to the pin than the portion 44. A slot (Fig. IV) is formed in the partition wall, comprising the portions 45 and 46 which are in the portions 44 and 43 respectively of the wall, said slot being straight throughout its length, and provided with a lateral notch 47 at the point where the portion 43 merges with the portion 44. A laterally extending projection 42 is provided on the side of the lever 40, as shown in Figs. II and III, at such a distance from the slot 39 as to be in line with the portion 44 of the partition wall when the pin 36 contacts with the upper end of the slot 39 as shown in Fig. I.

Considering the structure shown in Figs. VII, VIII and IX, it will be seen that I have shown a construction which is slightly modified from the form illustrated in Figs. I to VI, inclusive. In the construction shown in Figs. VII to IX, there is provided substantially the same sliding gear transmission as is shown in the other views. The transmission case 10 is provided with a top wall 50 which has a Z-shaped slot therein, comprising the portions 51 and 52, which are out of alignment with but extend parallel to each other and which are connected by the cross slot 53. A housing 54 is fastened on the top of said wall 50 and carries a transversely extending pin 55 at its upper end. A lever 56 is provided with a handle 57 and a transversely extending pin 58 near its lower end. A cup 59 is mounted on the lever 56 with the end of the pin 58 engaging the top of said cup 59 and a compression spring 60 is housed within said cup 59. The upper end of the housing 54 is rounded to form a ball 61 and is provided with an elongated slot 62 through which the lever 56 extends. A socket 63 is provided fitting on the ball shaped end 61 of the housing and a second socket 64 is provided fitting on said first named socket 63 and provided with an upwardly extending sleeve 65 surrounding the lever 56. The spring 60, compressed between the base of the cup 59 and said socket 64, normally holds said sockets 63 and 64 in engagement with the rounded end 61 of the housing, although yieldingly to permit sliding of said socket members relative to the housing. The lever 56 is provided with a hub 66 having a transverse opening therethrough, provided with outwardly flared ends 67, as shown in Fig. IX, and said pin 55 extends through said opening, the outwardly flared ends of which permit of the rocking of the lever 56 on the pin 55. From the hub 66 of the lever 56 there extends the arm 68 which extends downwardly through the slot in the wall 50 formed by the portions 51, 52 and 53. A fork 69 is formed on the lower end of the arm 68 below the partition wall 50 and engages the laterally extending boss 30 on the sleeve 28 as in the form of my device shown in Figs. I to VI, inclusive.

From the description of the parts given above, the operation of this device should be very readily understood. Referring to Figures I to VI, inclusive, it will be seen that, with the parts in the position shown in Fig. I the transmission is in neutral and no power will be transmitted from the drive shaft 14 to the main transmisison shaft 21. It will also appear that, when the parts are in this position, the arm 40 of the operating lever 37 is in the portion 46 of the control slot with the projection 42 on the arm 40 extending below the portion 43 of the partition wall, and in such position that a counterclockwise rocking (Fig. I) of the lever will cause the projection 42 to strike the end of the partition wall 44. If, now, the lever 37 is rocked so as to move the arm 40 until the projection 42 strikes the end of the portion 44 of the partition wall, the sleeve 28 will be moved to the right, in Fig. I, and the gear 24 will be moved on the splined portion 23 of the main transmission shaft until it meshes with the gear 18 on the counter shaft 16. The transmission shaft 21 will then be driven at low speed, the drive coming from the main drive shaft 14 to the gear 15 and the gear 17 meshing with it and from the gear 18 and the gear 24 meshing with it to the main transmission shaft. If the lever 37 is now rocked in the opposite direction, so as to cause the arm 40 to move to the outer end of the slot portion 46, the sleeve 28 will be moved to the left, in Fig. I, and the gear 24 will be moved out of mesh with the gear 18 until the clutch part on the gear 24 meshes with the clutch part on the gear 15 so that the main transmission shaft 21 is directly driven from the main drive shaft 14. This is the direct high speed drive.

In order to get a reverse drive it is necessary to lift up on the lever 37 so as to cause the pin 36 to engage the lower part of the slot 39. To do this, the lever must be first brought to the position for low-speed drive and, if the lever 37 is lifted when in this position, the projection 42 on the arm 40 will pass through the notch 47 into the plane above the portion 44 of the partition wall and, if the lever is then rocked on its fulcrum, said projection will pass above the portion 44 of the partition wall, allowing the arm to work in the slot portion 45. When the arm is moved to the end of the slot portion 45, the boss 30 of the sleeve 28 will be moved into line with the notch 27 in the rod 26, shown at the right in Fig. I, and this will bring the gear 24 into a position in line with the gear 19, in which position the gear 24 meshes with an idle gear which turns on another counter shaft (not shown) and meshes continuously with the gear 19 on the counter shaft 16. This arrangement of gears for reverse drive is old and hence is not illustrated in detail, but it will be seen that when the gear 24 is moved into this position, a drive will be obtained from the main drive shaft 14 through the gears 15 and 17, counter shaft 16, gear 19, idle gear and gear 24 to the main transmission shaft 21, so that the latter will be turned at low speed in a reverse direction to the direction of rotation of the main drive shaft 14.

It will be apparent that the lever 37 may be manipulated from neutral to low speed drive and from low speed drive to high speed drive direct without any lifting of the lever 37; or, in other words, the neutral position and all of the forward speed positions may be attained without any lifting of the lever 37. However, when it is desired to secure a reverse drive, it is necessary to lift the lever 37 so that it will work in the slot portion 45, and this arrangement prevents the inadvertent slipping of the gears into position for reverse drive due to the carelessness of the driver of the vehicle.

Referring to the construction shown in Figs. VII, VIII and IX, it will be observed that, with the parts in the position shown in Figs. VII and VIII, the gears are in neutral, and there is no driving connection between the main drive shaft 14 and the main transmission shaft 21. By rocking the lever 56 on its fulcrum pin 55 so as to move the arm 68 into the inner end of the slot 52, as indicated by the dotted lines 80 in Fig. VIII, the sleeve 28 and consequently the gear 24 will be moved into mesh with the gear 18 and a low speed, indirect drive will be secured. A further movement of the sleeve 28 or the gear 24 in this direction is prevented by the engagement of arm 68 with the end of the slot 52 so that the sleeve 28 cannot be moved further in this direction without rocking the lever 56 laterally on its pivot. To secure the high speed drive the lever 56 is rocked on the fulcrum pin 55 so as to carry the arm 68 to the outer end of the slot 52, as indicated by the dotted lines 81 in Fig. VIII, and this brings the gear 24 into clutching relation with the gear 15 securing a high-speed direct drive between the main drive shaft 14 and the main transmission shaft 21. In order to secure a reverse drive, the arm 68 must be moved into the outer end of the slot 51, and, in order to do this, it is necessary to bring the arm 68 to the position for low-speed indirect drive and then to rock the lever 56 laterally on its fulcrum, which is permitted by the opening 67 in the hub 66 of the lever provided with flared ends. Such lateral rocking of the lever 56 moves the arm 68 laterally so that it passes through the transverse slot 53 into line with the slot 51. The lever can then be rocked on its fulcrum so as to carry the arm 68 into the outer end of the slot 51 in which position the gear 24 is in line with the gear 19 so that a low-speed, indirect, reverse drive is attained through the gear 24, gear 19 and the idle gear which I have before described, but which is not shown in the drawing.

It will be observed that, in both of the constructions illustrated in the drawings, I have provided a novel gear shifter construction which comprises the sleeve 28 slidably mounted on the rod 26, and having a fork 29 which engages the grooved collar 25 attached to the sliding gear 24. The laterally extending housing 30 on the sleeve 28 carries the ball 33 which is normally pressed by the spring 32 into engagement with the rod 26 and is adapted to seat in any one of the grooves 27 which is in line with it. This tends to prevent inadvertent slipping of the sleeve 28 from the position to which it has been brought by the movement of the gear operating lever. The ball 33 and the spring 32 can be easily inserted in position through the opening 34, before the sleeve 28 is mounted on the rod 26. The boss 30, not only serves as a housing for the spring 32 and the ball 33, but also serves as an extension which is engaged by the fork 41 on the arm 40 of the gear shifter lever.

I am aware that the particular embodiment of my invention, which I have described and illustrated in the accompanying drawing and specification, is susceptible of considerable variation without departing from the spirit thereof, and, therefore I desire to claim my invention broadly, as well as specifically, as indicated by the appended claims.

Having thus described my invention, what I claim as new and desire to secure by Letters Patent, is:

1. In a device of the class described, the combination of a shaft; a gear slidable thereon; and means for shifting said gear, comprising a fixed shaft provided with a plurality of notches therein, a sleeve slidable on said shaft and provided with a fork engaging said gear to shift the same, said sleeve being provided with a lateral extension and an opening diametrically opposite said extension, a spring housed within said extension, a ball housed within said extension in position to engage said notches, said spring being compressed between said ball and the end of said extension, and a shifting lever provided with a fork engaging said lateral extension.

2. In a device of the class described, the combination of a shaft; a gear slidable thereon; and means for shifting said gear comprising a fixed shaft, provided with a plurality of notches therein, a sleeve slidable on said shaft and having a fork engaging said gear and a lateral extension, a spring compressed member housed in said extension and adapted to engage any one of said notches, and a gear shifting lever provided with a fork engaging said lateral extension.

3. In a device of the class described, the combination of a shaft; a gear slidable thereon; a fixed shaft; a sleeve slidable on said fixed shaft and provided with a fork engaging said gear to shift the same, and having a lateral extension; a spring pressed member housed within said extension; and a gear shifting lever provided with a fork engaging said extension.

4. In a device of the class described, the combination of change speed mechanism, a lever having high, intermediate and reverse positions for establishing high, intermediate and reverse relationships in said change speed mechanism, and a member having a slot in which said lever is moved, said slot being constructed so that the lever may be moved in a single direction from high through intermediate to reverse and to compel movement of the lever transversely to the above said direction before it can be moved to reverse position.

5. In a device of the class described, the combination of change speed mechanism, a lever having three aligned positions for establishing three operative relationships in said change speed mechanism, and means compelling the lever to be oscillated from one of said positions to another without movement in a direction of its length and compelling the lever to be moved in the direction of its length preliminary to oscillating the lever to one of said positions.

6. In a device of the class described, the combination of a casing, change speed mechanism, a lever mounted in said casing and having neutral, forward and reverse positions for establishing neutral, forward and reverse relationships in said change speed mechanism, and a partition in said casing having a slot in which said lever is oscillated from one position to another and which is constructed to compel movement of the lever in a direction longitudinally of its axis, preliminary to oscillation of the lever to its reverse position.

7. In a device of the class described, the combination of a casing, change speed mechanism, a lever mounted in said casing and having neutral, forward and reverse positions for establishing neutral, forward and reverse relationships in said change speed mechanism, and a partition in said casing having a slot in which said lever is oscillated from one position to another and which is constructed to compel movement of the lever in the direction of its length and transversely of said slot, preliminary to oscillation of the lever to its reverse position.

8. In a device of the class described, the combination of a casing, a partition in said casing having two portions offset from each other and a slot through both portions, change speed mechanism, a lever having neutral, forward and reverse positions for establishing neutral, forward and reverse relationships in said change speed mechanism and having an arm movable in said slot, and a projection on said arm, the arm being movable in the portion of the slot in one portion of the partition when the lever is moved from neutral position to a forward position or vice versa, and in the portion of the slot in the other portion of the partition when the lever is moved to its reverse position, the projection co-operating with the last mentioned portion of the partition to compel movement of said arm in the direction of its length preliminary to movement of the arm in the last mentioned portion of the slot when the lever is to be moved to the reverse position.

9. In a device of the class described, the combination of a casing, a pivot in said casing, a partition in said casing having two portions offset from each other, and a slot through both portions, change speed mechanism, a lever with a slot through which said pivot projects and having neutral, forward and reverse positions for establishing neutral, forward and reverse relationships in said change speed mechanism, an arm of the lever being movable in said slot in the partition, and a projection on said arm, the arm being movable in the portion of the slot in one portion of the partition when the lever is moved from neutral position to a forward position or vice versa and in the portion of the slot in the other portion of the partition when the lever is moved to the reverse position, the projection co-operating with the last mentioned portion of the partition to compel raising of said lever preliminary to movement of the lever to its reverse position.

10. In a device of the class described, the combination of a casing having a partition with a slot, change speed mechanism, a lever projecting through said slot and oscillated into neutral, forward and reverse positions for establishing neutral, forward and reverse relationships in said change speed mechanism, a pin in said casing serving as a pivot for said lever and projecting through an elongated slot in said lever, and a projection on said lever adapted to cooperate with said slot in the partition to compel the lever to be lifted before it is oscillated to reverse position.

11. In a device of the class described, the combination of a casing, a partition in said casing having two portions offset from each other and a slot through both portions, change speed mechanism including a sliding gear, a lever having a sliding engagement with said gear and adapted to move the latter into neutral, forward and reverse relationships, an arm of said lever being movable in said slot, a pivot projecting through a slot in said lever whereby the latter may be oscillated to neutral, forward or reverse positions and lifted preliminary to oscillation to reverse position, and a projection on said arm, the arm being movable in the portion of the first mentioned slot in the one portion of the partition when the lever is moved from neutral position to a forward position or vice versa and in the portion of said slot in the other portion of the partition when the lever is moved to the reverse position, the projection co-operating with the last mentioned portion of the partition to compel said lever to be lifted preliminarily to oscillation of the lever to its reverse position.

12. In a device of the class described, the combination of a casing, a partition in said casing having two portions offset from each other and a slot through both portions, change speed mechanism, a lever having neutral, forward and reverse positions for establishing neutral, forward and reverse relationships in said change speed mechanism and having an arm movable in said slot, and a projection on said arm, the arm being movable in the portion of the slot in one portion of the partition when the lever is moved from neutral position to a forward position or vice versa, and in the portion of the slot in the other portion of the partition when the lever is moved to its reverse position, the projection co-operating with the last mentioned portion of the partition to compel movement of said arm in the direction of its length preliminary to movement of the arm in the last mentioned portion of the slot when the lever is to be moved to the reverse position, and said projection co-operating with said partition to prevent movement of the lever in the direction of its length while it is being oscillated.

13. In a device of the class described, the combination of a casing, a pivot in said casing, a partition in said casing having two portions offset from each other, and a slot through both portions, change speed mechanism, a lever with a slot through which said pivot projects and having neutral, forward and reverse positions for establishing neutral, forward and reverse relationships in said change speed mechanism, an arm of the lever being movable in said slot in the partition, and a projection on said arm, the arm being movable in the portion of the slot in one portion of the partition when the lever is moved from neutral position to a forward position or vice versa and in the portion of the slot in the other portion of the partition when the lever is moved to the reverse position, the projection co-operating with the last mentioned portion of the partition to compel raising of said lever preliminary to movement of the lever to its reverse position, said projection also co-operating with said partition to prevent lifting or lowering of said lever while the same is being oscillated.

14. In a device of the class described, the combination of change speed mechanism, a lever oscillatable in a single plane and having various positions for establishing corresponding positions of engagement for said change speed mechanism and a member having a slot within which said lever is moved, said slot being constructed so as to permit oscillation of the lever therein between certain of its positions without movement of the lever in a direction longitudinally of its axis while necessitating movement of the lever in a direction longitudinally of its axis in being oscillated between certain other positions.

15. In a device of the class described, the combination of a single gear shifting slide having a plurality of different positions, a lever connected with said slide for shifting the same to and from its various positions and means requiring longitudinal movement of said lever to permit shifting said slide from one of its positions to another.

16. In a device of the class described, the combination of a guide, a gear shifting slide thereon having three positions, a lever for shifting said slide from one position to another and means necessitating a longitudinal movement of said lever when shifting said slide through an intermediate position.

17. In a device of the class described, the combination of a change speed system of gearing including a slidably mounted gear, a slidably mounted actuating member for said gear, a single pivoted actuating member for said slidably mounted member movable upon its pivot in a given plane to slide said slidable actuating member to effect certain operations of said change speed system of gearing, and means necessitating an additional movement of said pivoted actuating member in the same plane and independently of said pivot to preliminary to further sliding said slidable actuating member to effect another operation of said change speed system.

18. In a device of the class described, the combination of a change speed system of gearing including a slidably mounted gear and a pivoted actuating member operatively connected with said gear and movable upon its pivot in a given plane to effect certain independent operations of said gear, and means compelling an additional movement of said pivoted actuating member in the same plane and independently of said pivot in order to effect another operation of said gear.

19. In a device of the class described, the combination of a change speed mechanism including a slidably mounted operating member therefor adapted to effect certain predetermined positions of adjustment between the parts of said mechanism to produce different speed ratios, an actuating member operatively connected with said slidably mounted member and movable in a plane to establish all of said predetermined positions of adjustment, and means compelling the movement of said actuating member to a predetermined position of adjustment in said plane when moving it to cause said slidably mounted member to shift from one of said predetermined positions of adjustment to another.

20. In a device of the character described, the combination of a change speed mechanism, a lever having three alined positions for establishing three operative relationships in said change speed mechanism, and means compelling the lever to be moved in the direction of its length preliminarily to being oscillated to take one of said positions.

21. In a change speed mechanism, the combination of a shaft, a shiftable drive element thereon having a plurality of operative positions to produce forward rotation and a reverse position located in alinement therewith, a lever for shifting said element and means necessitating an adjustment of said lever to permit moving said element from a forward position to reverse position.

22. Gear changing mechanism, comprising a shaft, a gear slidable thereon through a plurality of forward drive positions to reverse drive position and vice versa, a lever movable back and forth for shifting said gear from one extreme position to the other, and means necessitating an adjustment of said lever preliminarily to the aforementioned movement thereof when said gear is to be shifted from the nearest forward drive position to the reverse drive position.

23. In a change speed mechanism, a forwardly rotatable drive shaft, a driven shaft, gearing including a single shiftable gear constructed to be operatively connected with said shafts to produce forward rotation of said driven shaft at a plurality of speeds or reverse rotation thereof as desired, a lever movable in a single plane for shifting said single slidable gear, and means necessitating an adjustment of said lever to permit movement of said gear from a forward position to reverse position.

In testimony whereof, I affix my signature.

EDWARD H. BELDEN.